United States Patent [19]

Barbehenn et al.

[11] Patent Number: 5,774,136
[45] Date of Patent: Jun. 30, 1998

[54] ULTRASONIC METHOD FOR MONITORING INKJET CARTRIDGE LEVELS

[75] Inventors: George Barbehenn, Vancouver, Wash.; Martin K. Mason, Andover, Mass.

[73] Assignee: Hewlett-Packard Company, Palo Alto, Calif.

[21] Appl. No.: 561,470

[22] Filed: Nov. 21, 1995

[51] Int. Cl.[6] .......................... B41J 2/195; G01F 23/296
[52] U.S. Cl. .............................. 347/7; 367/99; 73/861.18
[58] Field of Search ................................. 324/323, 306, 324/353; 367/87, 99; 73/1.83, 861.18, 861.06; 181/724; 347/7

[56] References Cited

U.S. PATENT DOCUMENTS

| 4,422,085 | 12/1983 | Sumitomo et al. ...................... 347/7 |
| 4,479,433 | 10/1984 | MacPhee et al. ..................... 101/364 |
| 4,965,596 | 10/1990 | Nagoshi et al. ......................... 347/36 |
| 5,036,892 | 8/1991 | Stembridge et al. .................... 141/1 |
| 5,303,585 | 4/1994 | Lichte .................................. 73/290 V |
| 5,586,085 | 12/1996 | Lichte ....................................... 367/99 |
| 5,612,723 | 3/1997 | Shimura et al. ......................... 347/46 |

*Primary Examiner*—Peter S. Wong
*Assistant Examiner*—Gregory J. Toatley, Jr.

[57] ABSTRACT

The present invention relates generally to inkjet printing mechanisms, and more particularly to an ultrasonic method for monitoring the ink level in an ink reservoir for an ink jet cartridge. This ultrasonic method includes the steps of sending an ultrasonic signal towards the ink reservoir, and receiving a series of reflected ultrasonic signals from the reservoir. In a processing step, the series of received reflected ultrasonic signals are processed in order to determine the ink level in the reservoir.

20 Claims, 6 Drawing Sheets

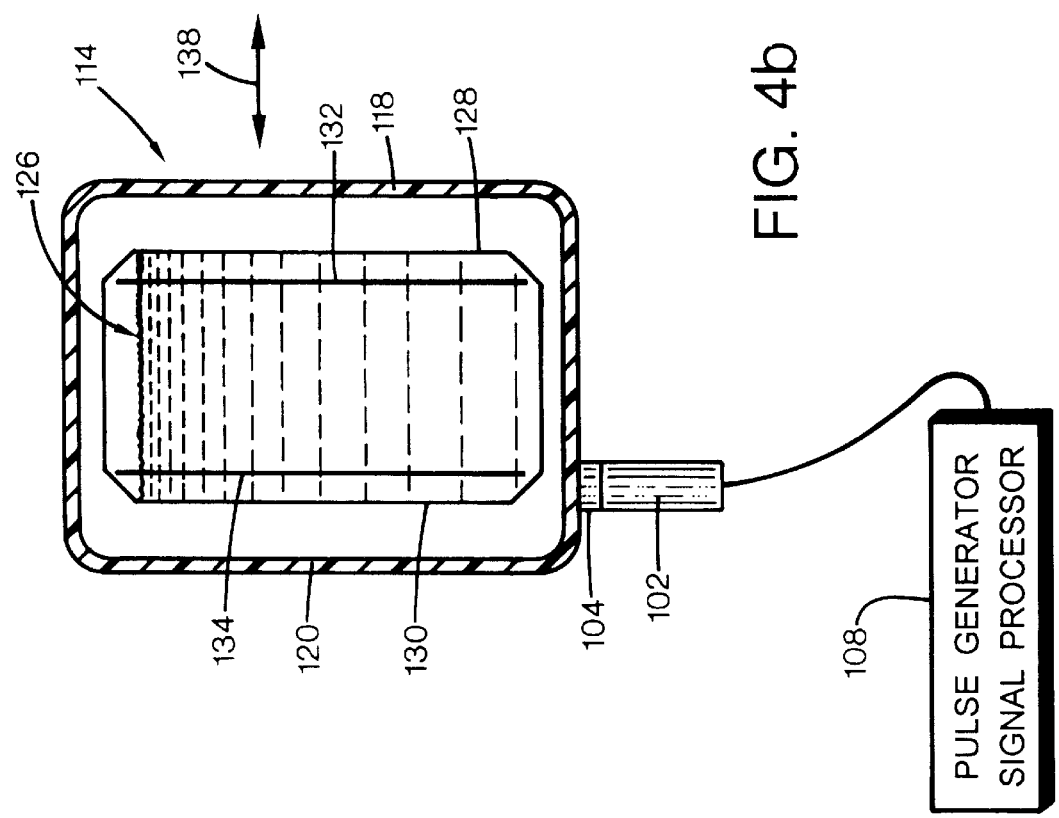
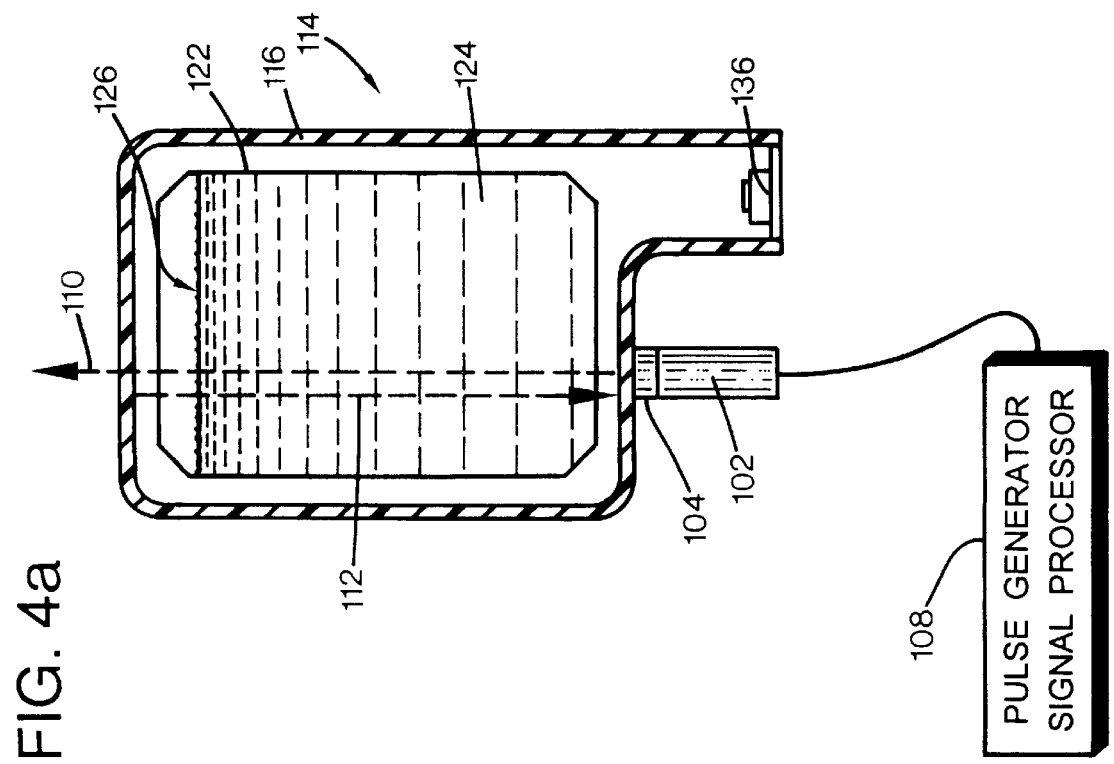

ULTRASONIC METHOD FOR MONITORING
INKJET CARTRIDGE LEVELS

FIELD OF THE INVENTION

The present invention relates generally to inkjet printing mechanisms, and more particularly to an ultrasonic method for monitoring the ink level in an ink reservoir for an ink jet cartridge.

BACKGROUND OF THE INVENTION

Inkjet printing mechanisms use cartridges, often called "pens," which shoot drops of liquid colorant, referred to generally herein as "ink," onto a page. Each pen has a printhead formed with very small nozzles through which the ink drops are fired. To print an image, the printhead is propelled back and forth across the page, shooting drops of ink in a desired pattern as it moves. The particular ink ejection mechanism within the printhead may take on a variety of different forms known to those skilled in the art, such as those using piezo-electric or thermal printhead technology. For instance, two earlier thermal ink ejection mechanisms are shown in U.S. Pat. Nos. 5,278,584 and 4,683,481, both assigned to the present assignee, Hewlett-Packard Company. In a thermal system, a barrier layer containing ink channels and vaporization chambers is located between a nozzle orifice plate and a substrate layer. This substrate layer typically contains linear arrays of heater elements, such as resistors, which are energized to heat ink within the vaporization chambers. Upon heating, an ink droplet is ejected from a nozzle associated with the energized resistor. By selectively energizing the resistors as the printhead moves across the page, the ink is expelled in a pattern on the print media to form a desired image (e.g., picture, chart or text).

To clean and protect the printhead, typically a "service station" is mounted within the printer chassis so the printhead can be moved over the station for maintenance. For storage, or during non-printing periods, the service stations usually include a capping system which humidically seals the printhead nozzles from contaminants and drying. During operation, clogs in the printhead are periodically cleared by firing a number of drops of ink through each of the nozzles in a process known as "spitting," with the waste ink being collected in a "spittoon" reservoir portion of the service station.

To maintain reliability of the inkjet printing mechanism during operation, it is helpful to have advanced warning for an operator and/or the printing mechanism itself as to when the ink level in a cartridge is getting low. This allows an operator to either refill the current cartridge or procure a fresh inkjet cartridge before the one in use is completely empty. If the cartridge is refillable, an early warning would allow to halt a printing operation automatically so that an operator can replenish the ink supply before the pen is dry-fired. Dry-firing an inkjet cartridge when empty may permanently damage the printhead.

A variety of solutions have been proposed for monitoring the level of ink within inkjet cartridges. For example, several mechanical devices have been proposed to determine when the ink supply falls below a predetermined level. One system uses a ball check valve within an ink bag to interrupts ink flow when the pen is nearly empty. Unfortunately, this system has no early warning capability.

Another system uses an integrated electronic or mechanic sense system which can be read by the printing mechanism but, on the other hand, requires substantial modification of the pen as well as additional interconnections.

Several more sophisticated detection systems have been devised, based upon temperature changes from spitting specific amounts of ink into the spittoon. Unfortunately, these systems all waste ink and unnecessarily fill the spittoon. One system detects the ink level by sensing the temperature of the printhead substrate as a test pattern is fired into the spittoon. This method generates a ratio by comparing changes in temperature from printing different portions of this test pattern. When the ratio exceeds a known value, a signal is sent to alert an operator and printing is stopped. In a related system, a history of printhead temperature changes is compiled, so ink flow is determined not only from the rate of temperature changes while firing the test pattern, but also from the change in the thermal history of the printhead.

Another out-of-ink detector system uses warming pulses to heat the cartridge to a higher temperature than its normal operating temperature. Following this prewarming, the cartridge firing pulses then eject ink into the spittoon and the temperature is sampled during firing to produce a set of temperature values. If the cartridge is ejecting a normal or nearly normal amount of ink, the temperature will decrease as the ink is ejected. However, if the cartridge is ejecting less than its normal amount of ink, this rate of temperature decrease will be less, or the temperature will stay the same or even increase. Thus, by monitoring the temperature gradient a shortage of ink can be detected.

Another system for detecting the level of ink tracks printhead usage, i.e. counts the ejected drops and then stores the count in a memory. When certain usage levels are detected, the printer drives certain resistors mounted on the printhead to an open circuit (burned out) condition. The number of burned out resistors are used to alert the operator of the low ink level. This system, however, is heavily dependent on the physical properties of the ink and pen bodies and it is not compatible with the advent of refillable pens which more and more tend to replace disposable pens.

All of the above ink detection methods suffer one or more drawbacks. For example, some systems fail to provide an early warning system, and abruptly interrupt a printing job at a certain ink level. Other systems compare temperature changes after spitting specified amounts of ink, which unfortunately wastes ink. This ink is "wasted" because, it is not used for printing, and it is not required for purging clogs from the printhead nozzles. Furthermore, this wasted ink must be contained within the printing mechanism and spittoon area. During the lifetime of the printing mechanism, this waste ink accumulation can become a real nuisance. In addition, the temperature based methods usually cannot actually monitor the ink level but provide an out-of-ink sensing only.

SUMMARY OF THE INVENTION

An overall goal of the present invention is to provide an inkjet printing mechanism which is reliable and which is adapted to monitor the ink level in an inkjet cartridge to give an early warning before the inkjet cartridge is completely empty, allowing to halt the printing operation so that an operator can refill or replace the cartridge.

A further object of the present invention is to provide a method of monitoring ink levels within an ink reservoir for an inkjet cartridge which is robust and accurate.

Another object of the present invention is to provide a method of monitoring ink levels which does not unnecessarily waste ink.

Still another object of the present invention is to provide a method of monitoring ink levels within an inkjet cartridge which does not require modification of the cartridge, is readily adaptable to different cartridge types and supports refillability.

According to one aspect of the present invention these objects are solved by providing a method of monitoring the ink level in an ink reservoir for an inkjet cartridge. The method includes the steps of sending an ultrasonic signal towards the ink reservoir, and receiving a series of reflected ultrasonic signals from the reservoir. In a processing step, the series of received reflected ultrasonic signals are processed in order to determine the ink level in the reservoir.

According to a further aspect of the present invention a method of monitoring the ink level in an ink jet cartridge installed in an inkjet printing mechanism having an ultrasonic transceiver is provided. The method includes the step of causing a relative movement of the inkjet cartridge and the ultrasonic transceiver so that the ultrasonic transceiver is located beneath the reservoir of the inkjet cartridge. In a sending step, an ultrasonic signal is sent from the transceiver towards the ink reservoir. The method also includes the steps of receiving a series of reflected ultrasonic signals from the reservoir at the transceiver, and processing the series of received reflected ultrasonic signals in order to determine the ink level in the reservoir.

According to another aspect of the invention, an inkjet printing mechanism is provided for printing with an inkjet cartridge including one or more ink reservoirs. The mechanism includes a sender for sending an ultrasonic signal towards the one or more ink reservoirs. The printing mechanism also has a receiver for receiving a series of reflected ultrasonic signals from said one or more ink reservoirs. The mechanism has a processing unit that is responsive to said series of reflected ultrasonic signals to determine the ink level in each of the reservoirs from the times at which the reflected ultrasonic signals in the series of reflected ultrasonic signals are received.

BRIEF DESCRIPTION OF THE DRAWINGS

The foregoing and other objects, features and advantages of the invention will become more apparent from the following detailed description of the present invention which should be read in conjunction with the accompanying drawings.

FIGS. 4a and 4b are schematic sectional side and back views of another embodiment of an ink level monitoring system of the present invention;

DETAILED DESCRIPTION OF THE PREFERRED EMBODIMENTS

Figure 1:
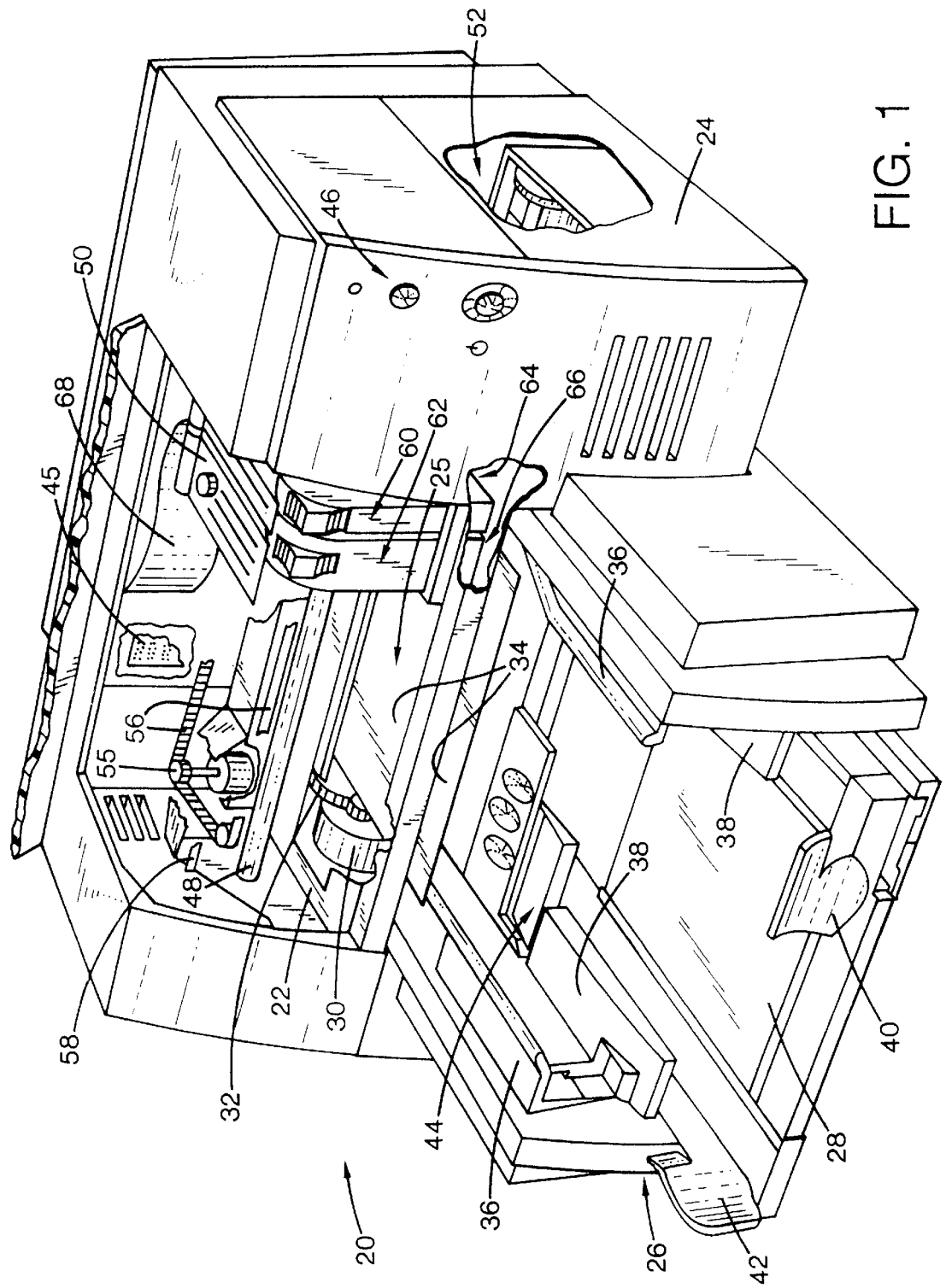
FIG. 1 is a fragmented, partially schematic, perspective view of one form of an inkjet printing mechanism employing an ink level monitoring system of the present invention for determining ink levels within an inkjet cartridge.

In the drawings like reference numbers indicate corresponding components throughout the views and descriptions thereof are omitted after once given.

FIG. 1 illustrates an embodiment of an inkjet printing mechanism, here shown as an inkjet printer 20, constructed in accordance with the present invention, which may be used for printing for business reports, correspondence, desktop publishing, and the like, in an industrial, office, home or other environment. A variety of inkjet printing mechanisms are commercially available. For instance, some of the printing mechanisms that may embody the present invention include plotters, portable printing units, copiers, cameras, video printers, and facsimile machines, to name a few. For convenience the concepts of the present invention are illustrated in the environment of an inkjet printer 20.

While it is apparent that the printer components may vary from model to model, the typical inkjet printer 20 includes a chassis 22 surrounded by a housing or casing enclosure 24, typically of a plastic material. Sheets of print media are fed through a print zone 25 by a print media handling system 26. The print media may be any type of suitable sheet material, such as paper, card-stock, transparencies, mylar, and the like, but for convenience, the illustrated embodiment is described using paper as the print medium. The print media handling system 26 has a feed tray 28 for storing sheets of paper before printing. A series of conventional paper drive rollers (not shown), driven by a stepper motor 30 and a drive gear assembly 32, may be used to move the print media from tray 28 into the print zone 25, as shown for sheet 34, for printing. After printing, the motor 30 drives the printed sheet 34 onto a pair of retractable output drying wing members 36. The wings 36 momentarily hold the newly printed sheet above any previously printed sheets still drying in an output tray portion 38 before retracting to the sides to drop the newly printed sheet into the output tray 38. The media handling system 26 may include a series of adjustment mechanisms for accommodating different sizes of print media, including letter, legal, A-4, envelopes, etc., such as a sliding length adjustment lever 40, a sliding width adjustment lever 42, and a sliding envelope feed plate 44.

The printer 20 also has a printer controller, illustrated schematically as a microprocessor 45, that receives instructions from a host device, typically a computer, such as a personal computer (not shown). The printer controller 45 may also operate in response to user inputs provided through a key pad 46 located on the exterior of the casing 24.

A carriage guide rod 48 is supported by the chassis 22 to slideably support an inkjet carriage 50 for travel back and forth across the print zone 25. One suitable type of carriage support system is shown in U.S. Pat. No. 5,366,305, assigned to Hewlett-Packard Company, the assignee of the present invention. The carriage 50 is also propelled along guide rod 48 into a servicing region housing a service station, as indicated generally by arrow 52, located within the interior of the casing 24. A carriage drive gear and DC motor assembly 55 is coupled to drive an endless belt 56. The motor 55 operates in response to control signals received from the printer controller 45. The belt 56 may be secured in a conventional manner to the pen carriage 50 to incrementally advance the carriage along guide rod 48 in response to rotation of motor 55.

To provide carriage positional feedback information to printer controller 45, an encoder strip 58 extends along the length of the print zone 25 and over the service station area 52. A conventional optical encoder reader may also be mounted on the back surface of printhead carriage 50 to read positional information provided by the encoder strip encoder strip 58. The manner of attaching the belt 56 to the carriage, as well as the manner providing positional feedback information via the encoder strip reader, may be accomplished in a variety of different ways known to those skilled in the art.

In the print zone 25, the media sheet 34 receives ink from an inkjet cartridge, such as a black ink cartridge 60 and/or a color ink cartridge 62. The cartridges 60 and 62 are also often called "pens" by those in the art. The illustrated color pen 62 is a tri-color pen, although in some embodiments, a set of discrete monochrome pens may be used. While the color pen 62 may contain a pigment based ink, for the purposes of illustration, pen 62 is described as containing three dye based ink colors, such as cyan, yellow and magenta. The black ink pen 60 is illustrated herein as containing a pigment based ink. It is apparent that other types of inks may also be used in pens 60, 62, such as paraffin based inks, as well as hybrid or composite inks having both dye and pigment characteristics.

The illustrated pens 60, 62 each include reservoirs for storing a supply of ink. The pens 60, 62 have printheads 64, 66 respectively, each of which have an orifice plate with a plurality of nozzles formed therethrough in a manner well known to those skilled in the art. The illustrated printheads 64, 66 are thermal inkjet printheads, although other types of printheads may be used, such as piezoelectric printheads. The printheads 64, 66 typically include substrate layer having a plurality of resistors which are associated with the nozzles. Upon energizing a selected resistor, a bubble of gas is formed to eject a droplet of ink from the nozzle and onto sheet 34 in the print zone 25. Ink may also be ejected into a spittoon portion of the service station 52 during servicing, or to clear plugged nozzles. The printhead resistors are selectively energized in response to firing command control signals delivered by a multi-conductor strip 68 from the controller 45 to the printhead carriage 50.

Figure 2:
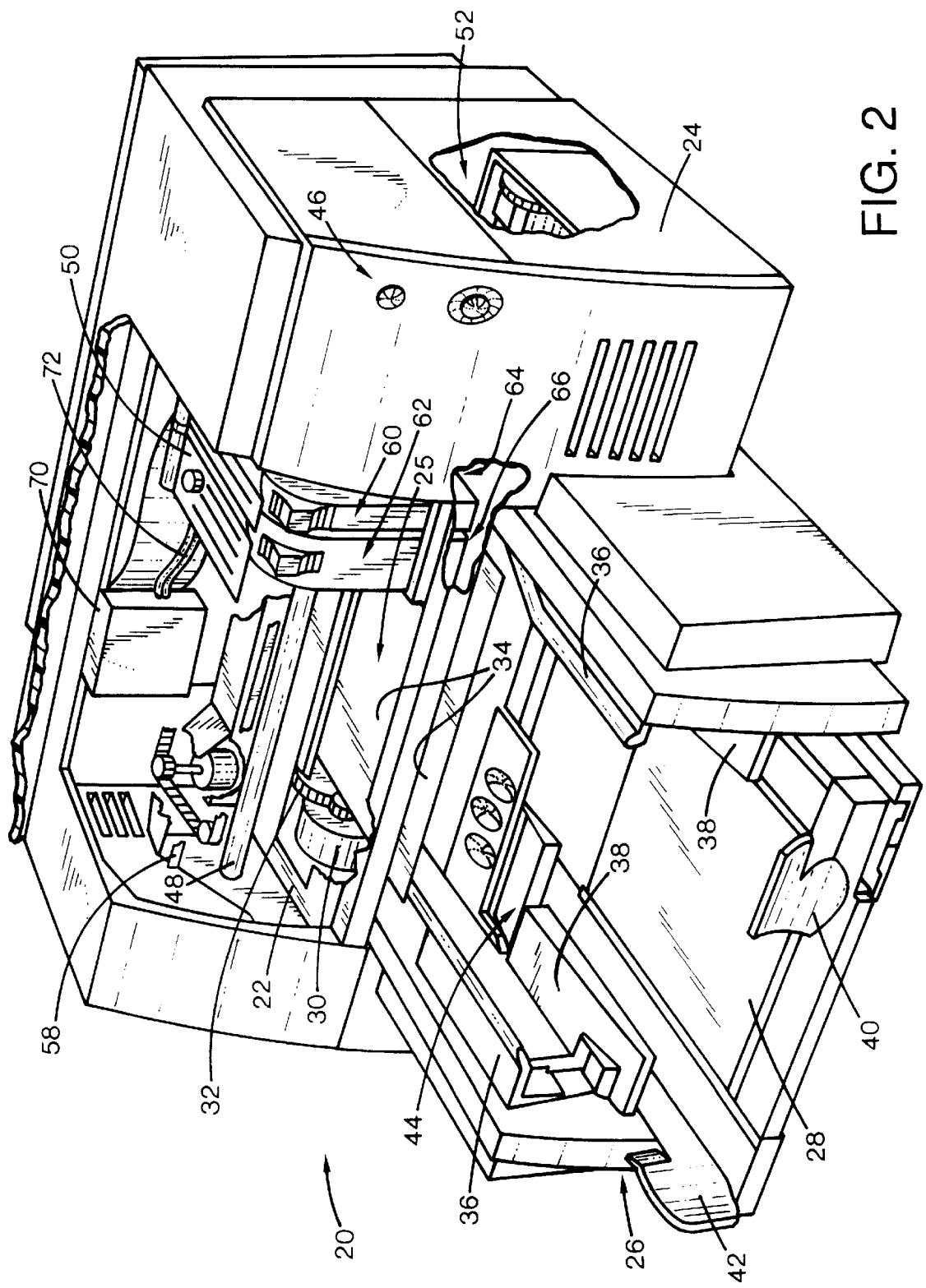
FIG. 2 is a similar view as in FIG. 1 showing a printing mechanism which uses an off-axis ink reservoir.

Although, a very specific printing mechanism has been described above, it is to be understood that the present invention could be used with any other type of inkjet printing mechanism. FIG. 2 schematically shows another type of printer, using a so-called off-axis reservoir, wherein the same components are designated with the same reference numbers as in FIG. 1. Hereunder, only those features of the printer of FIG. 2 will be described which distinguish this printing mechanism from the one shown in FIG. 1.

On the back wall of the chassis 22 of the printer a housing 70 for one or more ink reservoirs is shown schematically. The housing preferably contains four reservoirs for black, cyan, magenta, and yellow ink. From the reservoirs, flexible tubes 72 are feeding the ink to inkjet cartridges 60' and 62' which may comprise smaller intermediate reservoirs for storing small amounts of ink. The cartridges further include a substrate layer having a plurality of resistors which are associated with nozzles of a nozzle plate for ejecting ink therefrom.

Figure 3B:
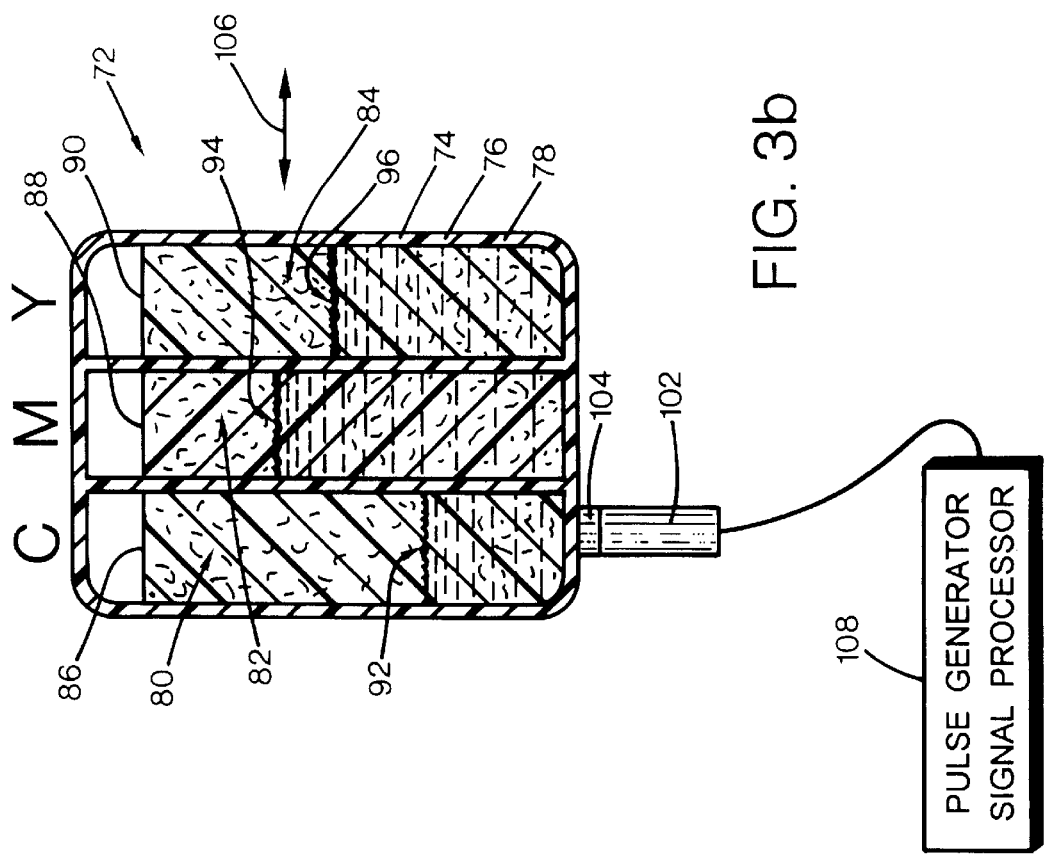
FIGS. 3a and 3b are schematic sectional side and back views of one embodiment of an ink level monitoring system of the present invention for determining ink levels within one or more reservoirs of an inkjet cartridge.
Figure 3A:
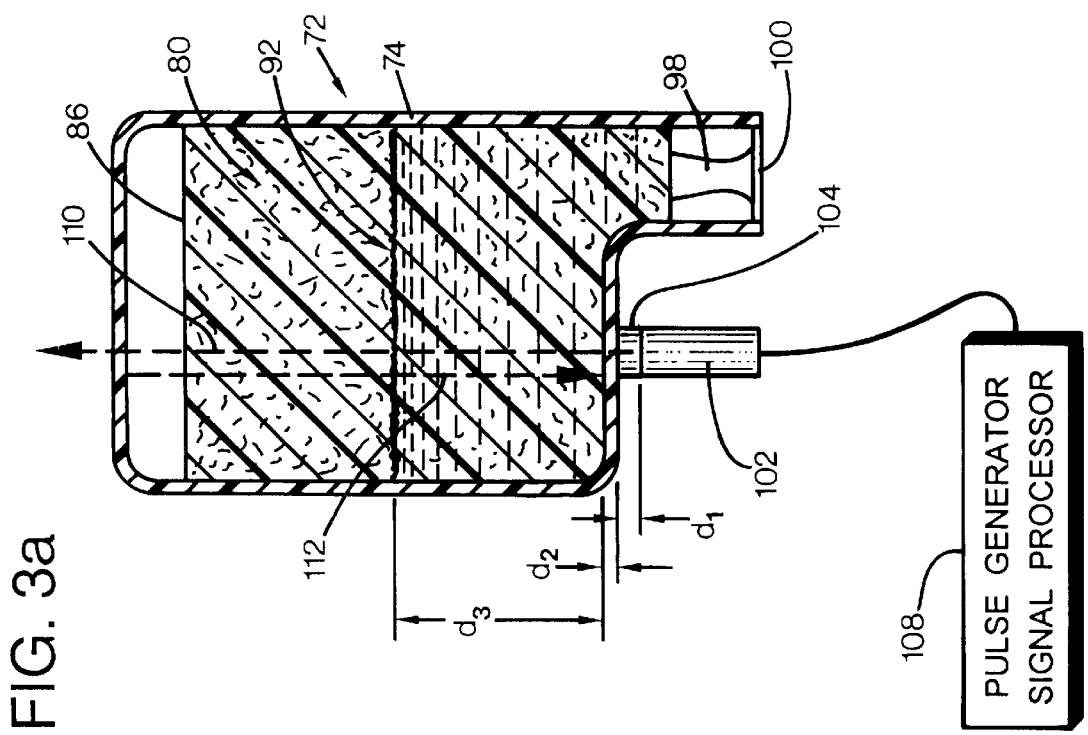

FIGS. 3a and 3b show one embodiment of an ink level monitoring system of the present invention which may be used in the printing mechanism of FIG. 1 for determining ink levels within one or more reservoirs of an inkjet cartridge.

FIGS. 3a and 3b schematically show a cross-sectional side view and back view of an inkjet cartridge or "pen" containing three reservoirs, e.g. for magenta, cyan and yellow ink. An inkjet pen of this type is disclosed in U.S. Pat. No. 5,025,271 to Baker et al., assigned to the present assignee, Hewlett-Packard Company, which can be referred to for further details of the structure of the inkjet pen. The pen body 72 includes an outer wall 74 and interior walls 76 and 78 which serve to partially define three compartments or reservoirs 80, 82, and 84 for receiving rectangular sections 86, 88, and 90 of foam as well as the three different inks. The respective ink levels are indicated at 92, 94, and 96.

In the lower region of the pen body 72 ink pipes 98 are provided in contact with the foam sections 86, 88, and 90 and the ink contained in the reservoirs. The ink pipes 98 provide an ink flow path to a lateral ink passage (not shown) located between the lower surface of the ink pipes and the facing surface of a semiconductor substrate 100 of the printhead. The ink will flow vertically from the reservoirs through the ink pipes into vertical passages (not shown) in the substrate member 100. These vertical passageways will then feed ink to a plurality of nozzle groups in the nozzle plate (not shown).

An inkjet cartridge of the type described above will be supported by a carriage 50 for travel back and forth across the print zone as well as in and out of the service station of the printing mechanism.

In the service station an ultrasonic transceiver 102, commonly referred to as an ultrasonic transducer, is provided. The transducer can be brought into contact with the lower surface of the pen 72 via a coupling medium 104, such as a solid silicone pad or a compliant disc, by sliding the carriage supporting the cartridge into the service station 50 and over the transducer 102. An Arrow 106 indicates the translational movement of the pen 72 across the transducer 102. In the embodiment of the present invention shown in FIGS. 3a and 3b the pen is moved so that the transducer sequentially is located beneath each of the reservoirs 80, 82, and 84 to determine the respective ink levels 92, 94, and 96 therein. The transducer 102 further is connected to a pulse generating and signal processing unit 108.

METHOD OF MONITORING THE INK LEVEL

Figure 6:
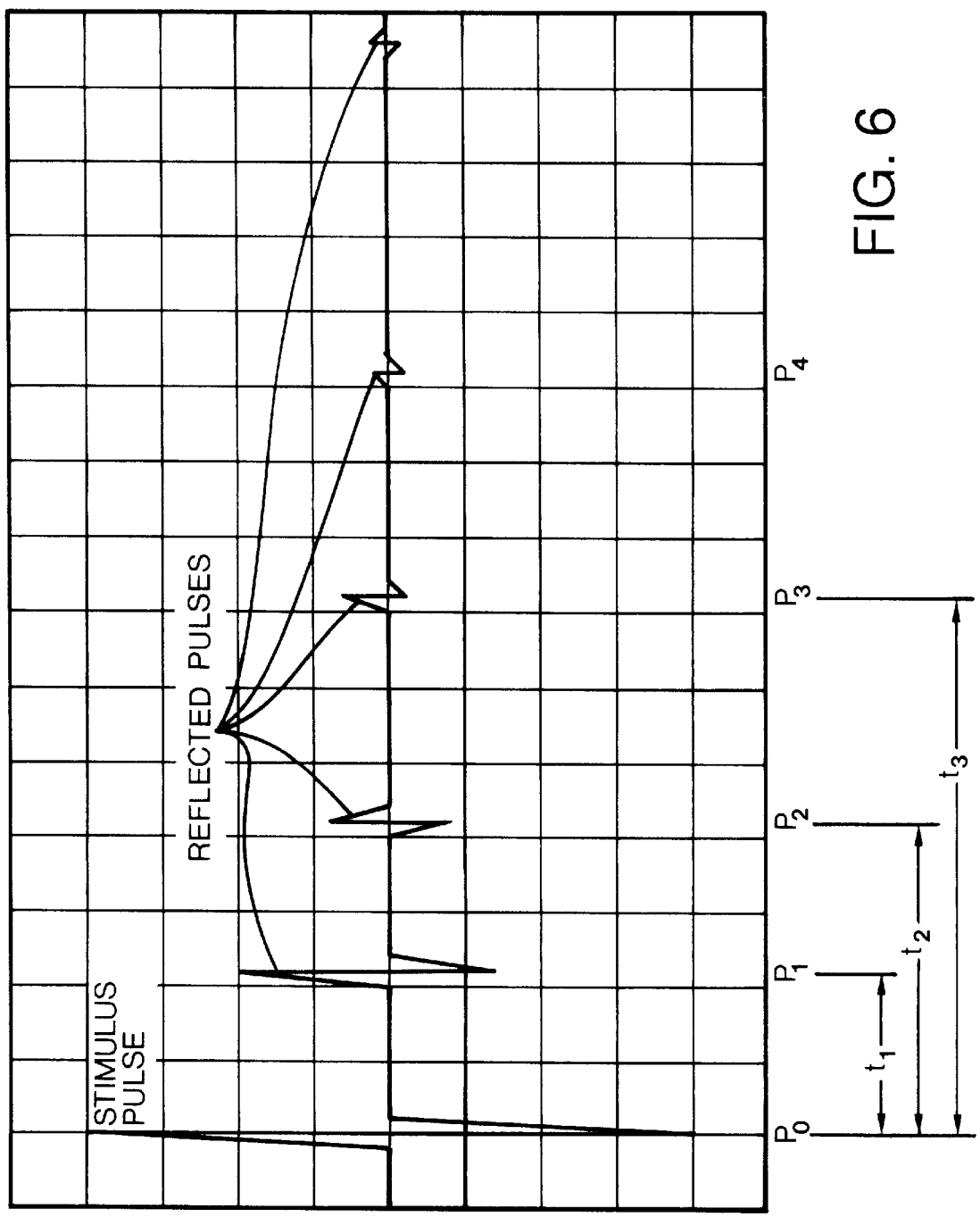
FIG. 6 is a schematic diagram of a series of received ultrasonic signals which are processed to determine the ink level in an ink reservoir according to the present invention.

The method of monitoring the ink level in an ink reservoir for an inkjet cartridge will be described with reference to FIGS. 3a and 6. FIG. 6 schematically shows an ultrasonic stimulus pulse and a series of reflected ultrasonic signals which might occur in the embodiment of FIG. 3a.

The ultrasonic transceiver or ultrasonic transducer 102 preferably is located under the inkjet cartridge, as mentioned above. As ultrasound does not travel well through air the transducer should be placed as close as possible to the outer wall of the ink reservoir or, alternatively, a coupling medium 104 can be used between the transducer head and the reservoir to be monitored.

The transducer emits an ultrasonic signal 110 into the reservoir which may be in the range of 20 kHz to 20 MHz, preferably 1 to 4 MHz. The ultrasonic signal 110 corresponds to a stimulus pulse $P_0$ in FIG. 6. In response to said ultrasound signal reflected pulses 112 ($P_1$, $P_2$, $P_3$ . . . in FIG. 6) will occur at each change in acoustic impedance encountered by this signal. Changes in the acoustic impedance generate the reflected signal. The acoustic impedance is defined as the product of the acoustic velocity and the density of a particular material:

Acoustic Impedance=(Acoustic Velocity)×(Density)

Therefore, each reflected pulse signals the transition from one medium, such as the wall of the reservoir, to another medium, such as the ink contained in the reservoir. There will be a reflection at the interface between the air or coupling medium and the bottom wall 74 of the reservoir, $P_1$ in FIG. 6; at the interface between the bottom wall and the cavity 80 containing the ink, $P_2$ in FIG. 6; at the interface of the ink level 92 and the bag or foam structure 86 or air above the ink, $P_3$ in FIG. 6; and so forth. As is well known in wave theory each different medium or material typically has a different density, $\rho_1, \rho_2, \rho_3, \ldots$, and a different acoustic velocity, $v_1, v_2, v_3, \ldots$, of the sound wave passing through the medium, and of course, a different acoustic impedance, which is the product of the acoustic velocity and the density.

The transceiver receives the reflected sound waves and converts them into electrical pulses. The received signals are then amplified and digitized by the processing unit 108 to measure the time interval of one round trip of the sound waves reflected at the different sections of the reservoir. Each received reflected signal represents one interface between different media in the inkjet pen. The series of pulses, also referred to as pattern of echoes, can be interpreted with knowledge of the pen or reservoir structure.

The ink level can be calculated in the following way.

The reflected pulse $P_1$ occurs at a time $t_1$ which is given by $t_1 = 2 d_1/v_1$, wherein $d_1$ is the thickness of the coupling medium 104 and $v_1$ is the velocity of the ultrasound wave traveling through the coupling medium.

The reflected pulse $P_2$ occurs at a time $t_2$ which is given by $t_2 = 2 d_1/v_1 + 2 d_2/v_2$, wherein $d_2$ is the thickness of the bottom wall 74 of the pen and $v_2$ is the velocity of the ultrasound wave traveling through the wall.

The reflected pulse $P_3$ occurs at a time $t_3$ which is given by $t_3 = 2 d_1/v_1 + 2 d_2/v_2 + 2 d_3/v_3$, wherein $d_3$ is the height of the ink level 92 in the reservoir 80 and $v_3$ is the velocity of the ultrasound wave traveling through the ink.

When the structure and materials (density) of the pen are known, $d_1, d_2, v_1, v_2,$ and $v_3$ are known parameters. The ink level in the reservoir may then easily be derived as $d_3 = (t_3 - 2 d_1/t_1 - 2 d_2/t_2) v_3/2$.

In praxis, in the received series of ultrasonic signals there will be a lot of reflections, as well as possible ambient noise. However, the range of valid reflections will be known to the processing unit, and all other reflections may be ignored. When processing the received reflected ultrasonic pulses preferably an echo window is used which controls the end of the time interval following the stimulus pulse during which reflected ultrasonic signals can be detected. The echo window should usually be set to a value greater than one round-trip pulse transit time in the thickest or slowest medium to be measured. The use of an echo window blends out reflected signals due to multiple reflections of the same stimulus pulse. The probability of acoustic noise at high frequencies ($\geq 1$ MHz) is very low, and can be rejected with suitable signal processing, such as averaging.

In FIG. 6 it may be noted that at a time $t_3$ a reflected pulse $P_3$ occurs which has an inverse phase when compared with pulses $P_1$ and $P_2$. This change of phase is due to the fact that pulses $P_1$ and $P_2$ result from reflections of the stimulus pulse at increasingly dense material whereas the pulse $P_3$, which is reflected from the surface of the ink, marks a transition from a medium having a higher density (ink) to a medium having a lower density (air or foam). This change of phase should be taken into account when processing the received reflected ultrasonic signals. The phase information of the received reflected ultrasound signal may further be used to discriminate additional state variables of interest.

By locating the transceiver beneath the reservoir to be monitored, the decrease of ink volume and the dropping ink level do not effect the quality of the reflected ultrasonic signals when the air gap between the top wall of the inkjet pen and the surface of the ink increases. An ultrasonic signal coming from above the reservoir would, on the other hand, have to travel through an increasingly large air gap which would deteriorate the signal quality. Of course, the present invention is not limited to placing the transducer beneath the reservoir. In accordance with design requirements of the printing mechanism, the transceiver could also be located at one side of the reservoir so that the ultrasonic signals enter the reservoir sideways and scan a vertical section of the reservoir to determine the height of the ink level by discriminating the density of the contents of the reservoir above (air) and below (ink) this level. Alternatively, the ultrasonic signals could enter the reservoir at a certain angle to the ink level.

Above, the method for monitoring the ink level in an ink reservoir according to the present invention has been described with the assumption that the exact structure of the inkjet cartridge is known to the system processing the received series of reflected ultrasonic signals. However, there might be a case that a plurality of different cartridge types can be used in the same printing mechanism. In this case, the current cartridge type has to be identified before the ink level can be derived from the received reflected signals. For determining the cartridge type generally the same series of reflected ultrasonic signals may be used which is later used for detecting the ink level. In this context it has to be kept in mind that—except for the ink level—the structure of one specific cartridge type is invariable. Therefore, the same cartridge type basically will always produce the same series of echo pulses, and by comparing said series of received echo pulses with different standard patterns of echo pulses associated to respective cartridge types the current cartridge can be identified. The known standard pattern of echo pulses can be stored in a memory of the processing unit 108. The same or a new series of reflected ultrasonic signals subsequently is used for determining the ink level in the cartridge, as described above.

When the ink level in a cartridge containing multiple ink reservoirs is to be detected the procedure described above is repeated for each reservoir by sliding the inkjet cartridge over and across the transducer 102.

As the propagation rate of the ultrasound wave changes with temperature and altitude, for increasing the reliability of the measurements conducted with the transducer 102 preferably a calibration step is performed before actually determining the height of the ink level. To this end, e.g. a detail of the carriage 50 is used as a reference datum which is, by manufacture, at known distances to the transducer 102 installed in the service area 52 and to the cartridges 60, 62 supported by the carriage. By sending a stimulus pulse towards said reference datum and receiving a reflected ultrasonic pulse therefrom the actual propagation time of the ultrasonic signal can be calculated. The ratio between the actual propagation time and a theoretical propagation time for this reference datum reflects the influence of ambient conditions, and it may later be used as a factor to be considered when determining the ink levels within the cartridges.

FURTHER EMBODIMENTS

A further embodiment of the present invention will be described with reference to FIGS. 4a and 4b. FIGS. 4a and 4b schematically show a sectional side view and back view of an inkjet cartridge using a collapsible ink bag as an ink reservoir. An inkjet pen of this type is disclosed in U.S. Pat. No. 5,280,300 to Fong et al., assigned to the present assignee, Hewlett-Packard Company, which can be referred to for further details of the structure of the inkjet pen. The inkjet pen 114 of FIGS. 4a and 4b comprises a housing having a pair of parallel side walls 118, 120 and a peripheral wall 116 containing a collapsible ink bag 122 and an ink reservoir therein 124. The ink level in the reservoir 124 is indicated at 126. The bag is comprised of a pair of rectangular flexible side panels 128, 130 secured to the peripheral wall 116 of the housing. The bag 122 has a pair of spaced apart relatively rigid but lightweight metal plates 132, 134 therein which are urged apart from each other into engagement with the flexible side panels 128, 130 by a double bowed metal spring (not shown) so as to expand the collapsible bag 122.

Ink from the bag is discharged, as is known in the art, by a head (not shown) mounted inside the housing through an inkjet nozzle plate indicated generally at 136 which provides for withdrawal of ink. As ink is ejected from the pen, the ink level initially does not drop but the side panels 128, 130 will gradually move closer together due to the partial vacuum created in the ink bag. Only when the side panels 128, 130 have reached their fully "collapsed" position, the ink level will start to drop. Therefore, in order to determine the correct ink level and volume, according to the present invention, a modified method will be performed.

The inkjet pen is moved across the ultrasonic transducer 102 in the direction of an arrow 138 in FIG. 4b. Ultrasonic stimulus pulses 110 are generated by the pulse generating and signal processing unit 108 and sent to the transducer 102; and respective received series of echo pulses 112 are sent back from the transducer 102 to said unit 108. The sending and receiving of ultrasonic signals will begin at a position close to one of the side walls 118 or 120, where the side panels 128 and 130 would be located when the ink bag 122 is completely filled with ink, and will continue towards the center of the ink bag 122. From the sequence of the received echo pulses the processing unit 108 can determine whether the transducer 102 is located beneath a section of the inkjet pen containing the ink bag 122, with ink therein, or outside of this area. Only when the processing unit 108 determines that the transducer is located beneath the ink volume contained in the ink bag 122 the ink level will be determined from the received series of echo pulses, as described above. Further, by gradually moving the inkjet pen 114 so that the transducer 102 beneath the pen slides from one side wall 120 towards the other side wall 118, the position of the side panels 128, 130 may be determined and may be used together with the information about the ink level to derive the overall ink volume contained in the ink reservoir 124.

Figure 5:
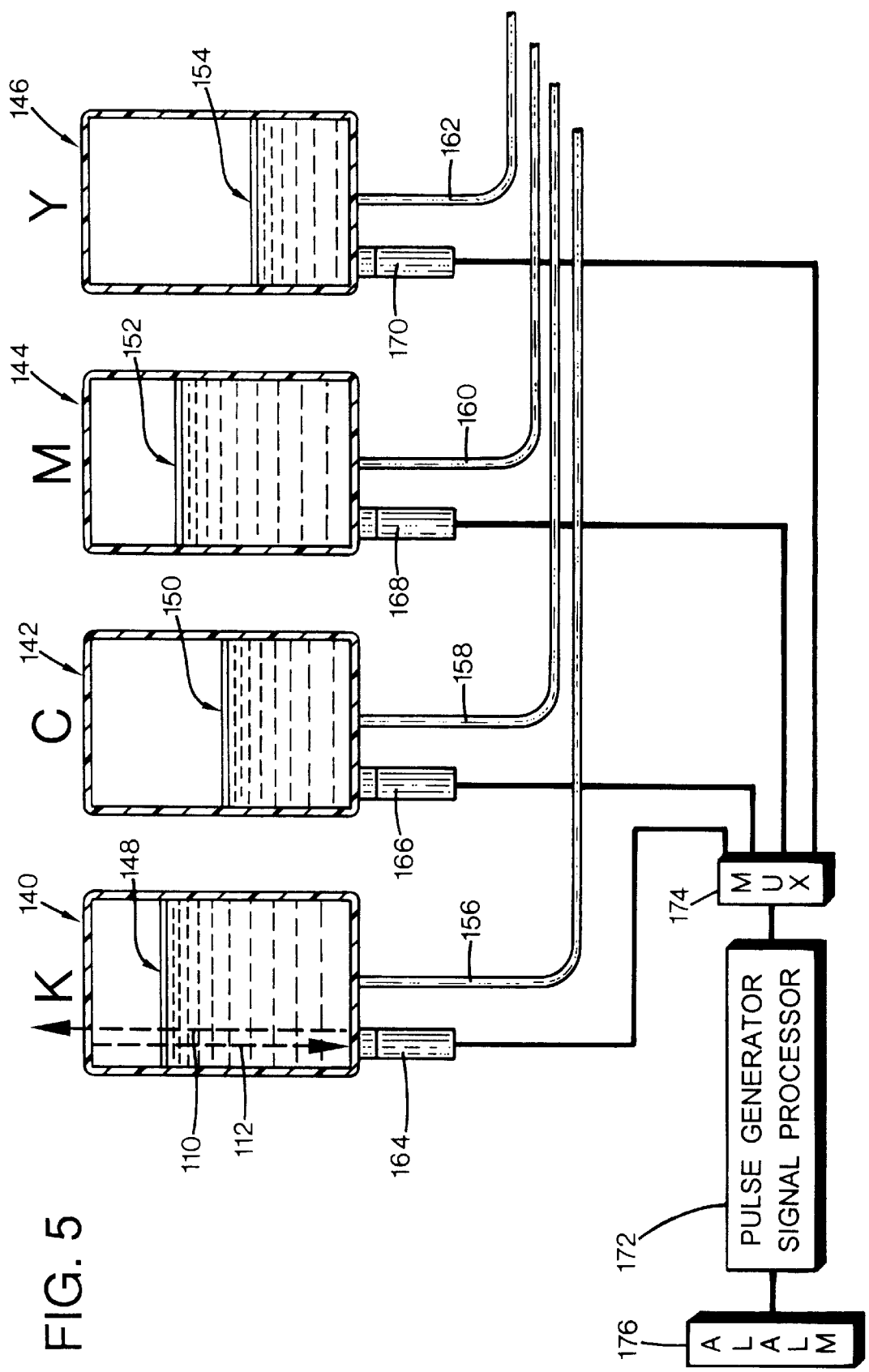
FIG. 5 is a schematic sectional front view of yet another embodiment of an ink level monitoring system of the present invention.

FIG. 5 schematically shows yet another embodiment of the present invention where a plurality of off-axis reservoirs are used for feeding ink to respective inkjet pen 60', 62' (FIG. 2) located on a carriage 50 (FIG. 2). This embodiment of an ink level monitoring system may be used in the printing mechanism of FIG. 2 for determining ink levels within one or more off-axis reservoirs 70 for an inkjet cartridge.

In FIG. 5 five reservoirs 140, 142, 144, and 146 are shown for black (K), cyan (C), magenta (M) and yellow (Y) ink, respectively. The respective ink levels in the reservoirs are indicated at 148, 150, 152, and 154. For improving the quality and distinctiveness of the echo pulse reflected from the surface of the ink level, a floating reflector may be provided on top of the ink, which is schematically shown as a thin disk on the surface of the ink in the reservoirs. Tubes 156, 158, 160, and 162 are leading from the reservoirs 140, 142, 144, and 154, respectively to the respective pens 60', 62' supported by the carriage 50 (FIG. 2) in the printing mechanism. The reservoirs are mounted to the back wall of the printing mechanism. Each reservoir 140, 142, 144, and 146 has an associated transducer 164, 166, 168, and 170, respectively, which is located beneath the reservoir. Each transducer is connected to an pulse generating and signal processing unit 172 via a multiplexer circuit 174. The multiplexer circuit 174 comprises four input/output channels, one for each transducer, and one input/output channel connected to the pulse generating and signal processing unit 172 for directing signals from the signal generator to the respective transducers 164, 166, 168, and 170 and, back from said transducers to the signal processing unit.

Basically the operation of the embodiment shown in FIG. 5 is as described with respect to FIGS. 3a, and 6, with the exception that the reservoirs and the transducer do not change their relative positions and the transducers are sequentially activated via the multiplexer circuit 174. A first ultrasonic stimulus pulse 110 is generated by the pulse generating and signal processing unit 172 and directed to the first transducer 164 via the multiplexer circuit 174; and a respective received series of echo pulses 112 is sent back from the first transducer 164 to said unit 172. The received series of echo pulses may either be stored, and processed later, or processed immediately according to the present invention. Then the multiplexer circuit 174 is switched and a second ultrasonic stimulus pulse (not shown) is generated by the pulse generating and signal processing unit 172 and directed to the second transducer 166; and a respective received series of second echo pulses (not shown) is sent back from the second transducer 166 to said unit 172. Also this second series of echo pulses may either be stored or processed immediately according to the present invention. And so forth, until all the ink levels in the reservoirs have been determined.

In the embodiment of the present invention shown in FIG. 5 the signal processing unit 172 is connected to an alarm circuit 176 which produces an alarm signal when one or more of the determined ink levels fall under a predetermined threshold value. When an alarm signal is produced, according to the present invention, the processing unit 172 could halt a printing operation automatically or finish the print job but inhibit a new printing operation so that an operator can replenish the ink supply or exchange the inkjet cartridge before the pen is dry-fired. The alarm signal could also be used to indicate to an operator that one or more ink reservoir are almost out of ink so that the operator can interrupt the printing operation manually and refill or replace the respective ink reservoirs. Further, a combination of these approaches may be employed in any suitable way. Although the alarm circuit 176 is only shown in the embodiment of FIG. 5, it preferably is also provided in the other embodiments. The alarm circuit can be implemented as part of the pulse generating and signal processing unit 108 or as a separate device, as shown in FIG. 5.

The method for monitoring the ink level in a reservoir for an inkjet pen has been described by way of example with respect to different types of pens and reservoirs. The expert in the field of inkjet printing will readily recognize that the method of this invention is also applicable to any other type of inkjet pen known in the art. Further, the floating reflector for improving the echo pulse reflected from the surface of the ink level, may be provided in any of the reservoirs, although it is only shown in one embodiment.

ADVANTAGES

The present invention provides a very flexible system for monitoring the level, i.e. the amount of ink in single-chamber or multi-chamber inkjet cartridges or in off-axis ink reservoirs for inkjet pens. This information may be gathered before each print job to advise the operator or the printing mechanism of the ink level status and to prevent a print operation, either manually or automatically, when the inkjet cartridge is out of ink and printing could cause permanent damage to the print head due to dry-firing. If an inkjet cartridge or its respective reservoirs are to be refilled the method of this invention will indicate the correct ink level before and after the filling.

While with the method and system of the present invention knowledge of the shape of an inkjet cartridge or its respective reservoir is required, they are easily adapted to a variety of pens and reservoirs, respectively. The method and system of this invention may also be used to differentiate between different inkjet cartridges by detecting differences in the details of the cartridges bodies and relating these differences to known cartridge types. The present invention does not require any modification of the inkjet pen to be monitored.

The system advantageously allows monitoring of ink levels within the pen or reservoir, without expending any additional ink through spitting. Moreover, this system provides an early warning detection of an eminent out-of-ink condition. It is apparent that this system may be used either with pigment based inks, such as in a black cartridge, or with dye based inks, as in a color cartridge, or other types of ink known to those skilled in the art. This technique advantageously accomplishes ink level monitoring without decreasing throughput, i.e., a printer specification rating given in terms of pages per minute.

While the presently preferred embodiments of the present invention have been showed and described, it is to be understood that this disclosure is for the purpose of illustration and that various changes and modifications may be made without departing from the scope as set forth in the appended claims.

We claim:

1. A method of monitoring the inklevel in an ink reservoir of a replaceable ink jet cartridge installed in a printing mechanism for reciprocating back and forth across a print media, comprising the steps of:
   (a) sending an ultrasonic signal towards the ink reservoir;
   (b) receiving a series of reflected ultrasonic signals from the reservoir; and
   (c) processing the series of received reflected ultrasonic signals in order to determine the ink level in the reservoir.

2. The method of claim 1 wherein said ultrasonic signal is a high frequency signal, in the range of 4 to 5 MHz.

3. The method of claim i wherein:
   the said ultrasonic signal is sent towards the ink reservoir from a location beneath the reservoir so as to induce reflected ultrasonic signals at the interface of an ambient medium and a wall of the reservoir, the interface of the wall of the reservoir and the ink contained in a cavity of the reservoir, and the surface level of the ink in the reservoir; and
   the ink level is determined as a function of the time at which each of the reflected ultrasonic signals is received.

4. The method of claim 1, comprising the further steps of:
   sending an reference ultrasonic signal towards a reference datum having a known position;
   receiving a reflected reference ultrasonic signal from the reference datum; and
   processing the reflected reference ultrasonic signal and using the information contained there in for calibration of the processing of said series of reflected ultrasonic signals.

5. The method of claim 1, comprising the further step of producing an alarm signal when the determined ink level falls under a predetermined threshold value.

6. The method of claim 1, wherein the step of processing said series of reflected ultrasonic signals comprises the steps of:
   comparing said series of received ultrasonic signals with known signal patterns for known types of ink reservoirs in order to determine the reservoir type or shape; and
   subsequently using the information about the reservoir type or shape to determine the ink level in the reservoir.

7. A method of monitoring the ink level in an ink jet cartridge installed in an inkjet printing mechanism having an ultrasonic transceiver, comprising the steps of:
   (a) causing a relative movement of the inkjet cartridge and the ultrasonic transceiver so that the ultrasonic transceiver is located beneath the reservoir of the inkjet cartridge;
   (b) sending an ultrasonic signal from the transceiver towards the ink reservoir;
   (c) receiving a series of reflected ultrasonic signals from the reservoir at the transceiver; and
   (d) processing said series of received reflected ultrasonic signals in order to determine the ink level in the reservoir.

8. The method of claim 7, wherein said ultrasonic signal is a high frequency signal in the range 4 to 5 MHz.

9. The method of claim 8, comprising the further steps of:.
   sending a reference ultrasonic signal towards a reference datum at the printing mechanism having a known distance to the transceiver;
   receiving a reflected reference ultrasonic signal from the reference datum at the transceiver; and
   processing the reflected reference ultrasonic signal and using the information contained therein for calibration of the processing of said series of reflected ultrasonic signals.

10. The method of claim 7 wherein the inkjet cartridge contains one or more ink reservoirs, and wherein:
    the inkjet cartridge is moved so that the transceiver sequentially is located beneath each one of the reservoirs; and
    steps (b) to (d) are performed respectively for each location beneath a reservoir.

11. The method of claim 10 wherein an alarm signal is produced when at least one of the determined ink levels falls under a predetermined threshold value.

12. An ink jet printing mechanism for printing with an ink jet cartridge having one or more ink reservoirs, said ink jet printing mechanism comprising:
    carriage means for moving said ink jet cartridge across a print media;
    a sender for sending an ultrasonic signal towards said one or more ink reservoirs;
    a receiver for receiving a series of reflected ultrasonic signals from said one or more ink reservoirs; and
    a processing unit responsive to said series of reflected ultrasonic signals to determine the ink level in each of the reservoirs from the times at which the reflected ultrasonic signals in said series of reflected ultrasonic signals are received.

13. The mechanism of claim 12, further comprising a signal device responsive to said processing unit to produce an alarm signal when at least one of the determined ink levels in said one or more reservoirs falls under a predetermined threshold value.

14. The mechanism of claim 12 wherein said sender and said receiver are implemented as one ultrasonic transceiver.

15. The mechanism of claim 14, further comprising means for causing a relative movement of the ultrasonic transceiver and the ink reservoirs so that said transceiver is sequentially located beneath each one of said one or more ink reservoirs.

16. The mechanism of claim 15, wherein said one or more ink reservoirs are housed in said inkjet so cartridge and a moveable carriage is provided for holding and moving said inkjet cartridge that said transceiver is sequentially located beneath each one of said one or more ink reservoirs housed in said inkjet cartridge.

17. The mechanism of claim 14, wherein:
- a plurality of off-axis ink reservoirs external to the inkjet cartridge are provided and are connected to the inkjet cartridge via feeding means;
- a plurality of transceivers is provided and said transceivers each are associated to a different corresponding reservoir; and multiplexer means are provided for sequentially coupling each of said transceivers with a common transceiver circuit which is provided in said processing unit.

18. The mechanism of claim 14, wherein:
- a plurality of ink reservoirs are housed in the inkjet cartridge and a moveable carriage is provided for holding and moving said inkjet cartridge;
- a plurality of transceivers is provided on said carriage for movement together with said inkjet cartridge and said transceivers each are associated to a different corresponding reservoir; and
- multiplexer means are provided for sequentially coupling each of said transceivers with a common transceiver circuit which is provided in said processing unit.

19. The mechanism of claim 14 wherein the ultrasonic transceiver is adapted to emit high frequency signals in tie range of 4 to 5 MHz.

20. The mechanism of claim 14 wherein a reflector is provided on top of the ink in said one or more reservoirs.

* * * * *

UNITED STATES PATENT AND TRADEMARK OFFICE
CERTIFICATE OF CORRECTION

PATENT NO. : 5,774,136

DATED : June 30, 1998

INVENTOR(S) : Barbehenn et al.

It is certified that error appears in the above-identified patent and that said Letters Patent is hereby corrected as shown below:

Column 4, (line 63), delete "encoder strip" after "the".

In the Claims

Column 11, (line 48), delete "i" and insert therefor --1--.

Column 11, (line 65), delete "there in" and insert therefor --therein--.

Column 13, (line 11), delete "so" after "inkjet".

Column 13, (line 22), after "and" start a new paragraph.

Column 14, (line 17), delete "tie" and insert therefor --the--.

Signed and Sealed this

Second Day of February, 1999

Attest:

Attesting Officer

*Acting Commissioner of Patents and Trademarks*